US012803071B2

(12) United States Patent
Bartelt et al.

(10) Patent No.: US 12,803,071 B2
(45) Date of Patent: Nov. 17, 2026

(54) SYSTEMS AND METHODS FOR BATTERY RECYCLING

(71) Applicant: BCA INDUSTRIES, INC., Milwaukee, WI (US)

(72) Inventors: Douglas Bartelt, Jackson, WI (US); Joseph Bartelt, Caledonia, WI (US)

(73) Assignee: BCA Industries, INC., Milwaukee, WI (US)

( * ) Notice: Subject to any disclaimer, the term of this patent is extended or adjusted under 35 U.S.C. 154(b) by 446 days.

(21) Appl. No.: 18/180,515

(22) Filed: Mar. 8, 2023

(65) Prior Publication Data

US 2024/0304881 A1 Sep. 12, 2024

(51) Int. Cl.

| | |
|---|---|
| ***H01M 10/54*** | (2006.01) |
| ***B02C 18/00*** | (2006.01) |
| ***B02C 18/06*** | (2006.01) |
| ***B02C 23/14*** | (2006.01) |
| ***B02C 23/18*** | (2006.01) |
| ***B09B 3/35*** | (2022.01) |

(Continued)

(52) U.S. Cl.

CPC ......... *H01M 10/54* (2013.01); *B02C 18/0084* (2013.01); *B02C 18/06* (2013.01); *B02C 23/14* (2013.01); *B02C 23/18* (2013.01); *B09B 3/35* (2022.01); *H01M 6/52* (2013.01); *B02C 2201/06* (2013.01); *B09B 2101/16* (2022.01); *Y02W 30/52* (2015.05)

(58) Field of Classification Search

CPC ..... H01M 6/52; H01M 10/54; B02C 18/0084; B02C 18/06; B02C 23/14; B02C 23/18; B02C 2201/06; B09B 3/35; B09B 2101/16; Y02W 30/52; Y02W 30/84

See application file for complete search history.

(56) References Cited

U.S. PATENT DOCUMENTS

| | | | |
|---|---|---|---|
| 5,377,920 | A | 1/1995 | Alavi et al. |
| 5,888,463 | A | 3/1999 | McLaughlin et al. |
| 6,254,737 | B1 | 7/2001 | Edelstein et al. |

(Continued)

FOREIGN PATENT DOCUMENTS

| | | |
|---|---|---|
| AU | 2020202401 | 4/2020 |
| AU | 2021282464 | 1/2022 |

(Continued)

OTHER PUBLICATIONS

The future of automotive lithium-ion battery recycling: Charting a sustainable course; Sustainable Materials and Technologies; ; Gaines, Linda; 2014; 6 pgs.

(Continued)

*Primary Examiner* — Christopher L Templeton
*Assistant Examiner* — Matthew Stephens
(74) *Attorney, Agent, or Firm* — Ryan Kromholz & Manion, S.C.

(57) ABSTRACT

Lithium-ion batteries are recycled by a series of physical and chemical processes. Used batteries are comminuted, and then the shredded material stream is further processed to create black mass for further refinement into constituent materials that are used in the production of new batteries. Black mass is produced from a liquid stream and a solid stream. The method is adaptable to different types and sizes of lithium-ion batteries and is designed to minimize waste and optimize material recovery.

23 Claims, 6 Drawing Sheets

(51) Int. Cl.
*B09B 101/16* (2022.01)
*H01M 6/52* (2006.01)

(56) References Cited

U.S. PATENT DOCUMENTS

| | | | | |
|---|---|---|---|---|
| 7,833,646 | B2 | 11/2010 | Zenger et al. | |
| 8,128,013 | B2 | 3/2012 | Bartelt et al. | |
| 9,450,277 | B2 | 9/2016 | Dunagan et al. | |
| 9,620,828 | B2 | 4/2017 | Dunagan et al. | |
| 9,912,022 | B2 | 3/2018 | Dunagan et al. | |
| 10,522,884 | B2 | 12/2019 | Wang et al. | |
| 10,707,544 | B2 | 7/2020 | Dunagan et al. | |
| 10,919,046 | B2 | 2/2021 | Kochhar et al. | |
| 10,960,403 | B2 | 3/2021 | Kochhar et al. | |
| 11,077,452 | B2 | 8/2021 | Kochhar et al. | |
| 11,135,595 | B2 | 10/2021 | Kochhar et al. | |
| 11,273,453 | B2 | 3/2022 | Kochhar et al. | |
| 2010/0012149 | A1* | 1/2010 | Arimura | H01M 10/54 134/184 |
| 2015/0080630 | A1 | 3/2015 | Dunagan et al. | |
| 2020/0078796 | A1* | 3/2020 | Kochhar | B02C 23/36 |
| 2022/0152626 | A1 | 5/2022 | Kochhar et al. | |
| 2022/0302515 | A1 | 9/2022 | Jang et al. | |
| 2022/0344737 | A1* | 10/2022 | Belharouak | H01M 10/54 |
| 2023/0076830 | A1* | 3/2023 | Verma | B08B 3/08 |
| 2023/0115052 | A1* | 4/2023 | Bobbili | B09B 3/40 423/179.5 |
| 2024/0218481 | A1* | 7/2024 | Hanisch | C22B 23/0453 |
| 2024/0238800 | A1* | 7/2024 | Biederman | B03B 9/061 |
| 2024/0250236 | A1* | 7/2024 | Pan | H01M 10/0525 |
| 2025/0038290 | A1* | 1/2025 | Jüttner | B09B 3/30 |

FOREIGN PATENT DOCUMENTS

| | | |
|---|---|---|
| CA | 2730320 | 9/2010 |
| CA | 2992019 | 1/2017 |
| CN | 113731607 | 12/2021 |
| CN | 115149138 A | 10/2022 |
| EP | 1148571 | 10/2001 |
| EP | 3670686 | 6/2020 |
| JP | 2004339572 | 12/2004 |
| WO | WO2017/006209 | 1/2017 |
| WO | WO2019/232574 | 12/2019 |
| WO | WO2021/161240 | 8/2021 |
| WO | WO2022/032345 | 2/2022 |
| WO | WO2022/246566 | 12/2022 |
| WO | WO2022/263812 | 12/2022 |

OTHER PUBLICATIONS

Data Sheet: Sealed Aqueous Shredders Safe EV Battery Size Reduction; ShredTech; printed Jan. 11, 2023.

* cited by examiner

SYSTEMS AND METHODS FOR BATTERY RECYCLING

BACKGROUND OF THE INVENTION

Batteries, such as lithium-ion (also known as Li-ion) batteries, are expected to play a critical role in the growth of clean energy and electrification. For instance, the demand for electric vehicles is expected to continue to grow in the coming years, and lithium-ion batteries will play a critical role in this growth. Lithium-ion batteries are the preferred choice for electric vehicles due to their high energy density, long cycle life, and low cost.

Lithium-ion battery technology is constantly evolving, and researchers are working on developing new materials and designs that can further improve the performance and safety of these batteries.

Lithium-ion batteries have a finite life, and their recycling is an important part of their life cycle. New recycling methods that are more efficient, cost-effective, and environmentally friendly are crucial to the long-term sustainability of this technology.

Lithium-ion batteries are also being used for grid storage to help integrate renewable energy sources into the electrical grid, and in a wide range of portable devices, such as laptops, smartphones, and wearable devices. This will become increasingly important as renewable energy sources become more prevalent.

Lithium-ion batteries are expected to be a key technology in the transition to clean energy and electrification. The development of new materials and designs, as well as advances in recycling and sustainability, are expected to further improve the performance and environmental impact of these batteries.

The recycling of lithium-ion batteries is an important part of the life cycle of batteries, as it enables the recovery of valuable materials and helps to reduce the environmental impact of battery production and disposal. The recycling process is carefully controlled to minimize the risk of environmental contamination and to ensure that the extracted materials are of high quality.

Lithium-ion batteries are recycled through a series of processes that separate and extract valuable materials, such as lithium, cobalt, nickel, and other metals. The recycling process typically involves collection, sorting, disassembly, shredding, separation, extraction and purification.

In the collection step, used batteries are collected and transported to a recycling facility. The batteries may be collected from a variety of sources, including consumer electronics, electric vehicles, and industrial applications.

In the sorting step (optional), batteries are sorted by type, chemistry, and size to ensure that each battery is processed appropriately. Next, in the disassembly step (optional), the batteries can be disassembled to remove any outer casings or other materials that are not part of the battery cell.

In the shredding step, the battery cells are shredded into small pieces to make it easier to extract valuable materials.

In the separation step, the shredded battery cells are separated into different metals and materials using a combination of physical and chemical processes. These processes may include vibration, gravity separation, magnetic separation, and leaching.

In the extraction step, valuable metals, such as lithium, cobalt, and nickel, are extracted from the other materials using chemical processes. This may include processes such as electrolysis, smelting, and refining.

Last, in the purification step, the extracted metals are purified to remove any impurities and to prepare them for reuse in the production of new batteries.

In some systems, the recycling process can be separated into two general steps: i) the shredding (comminution) of batteries and production of "black mass" from the shredded components; and ii) downstream refinement of the black mass into its constituent components.

The present invention concerns the steps in the lithium-ion battery recycling process leading to the production of black mass. Black mass refers to a mixture of different metals and other materials that are produced as a result of the recycling process. The mixture typically contains a variety of different metals, such as manganese, lead, tin, nickel, cobalt, and lithium.

A black mass is a mixture of electrode materials, including carbon and metals, that are recovered during the recycling process of lithium-ion batteries. The black mass is typically generated by shredding and grinding the battery cells to liberate the electrode materials from the current collectors and separator.

The black mass can be further processed to separate and recover the valuable metals. The recovered carbon can also be used as a fuel or as a filler material in the production of new electrodes.

The term "black mass" comes from the appearance of the mixture, which is typically dark in color due to the presence of carbon and other impurities.

Black mass is a valuable resource in the battery recycling industry, as it contains a variety of different metals and other materials that can be reused. The recycling of black mass helps to reduce the need for mining and to promote sustainability in the battery industry.

SUMMARY OF THE INVENTION

In the present invention, lithium-ion batteries are collected, comminuted, and battery components are separated leading to the production of black mass.

A system for recycling used lithium-ion batteries that enables the safe and efficient recovery of valuable materials is disclosed. The system includes a crushing mechanism that comminutes the batteries, and a series of physical and chemical processes that extract valuable materials such as lithium, cobalt, and nickel from the crushed material (also the cathode, anode, and electrolyte of the batteries). The extracted materials can be reused in the production of new batteries, reducing the need for mining and reducing the overall environmental impact of lithium-ion battery production. The systems and methods are adaptable to different types and sizes of lithium-ion batteries, and is designed to minimize waste and optimize material recovery.

Comminution is done in a controlled environment to minimize the risk of harm or damage to the environment. The cathode, anode, and electrolyte are separated and treated to recover the metals and other valuable components.

The cathode material, which is typically composed of cobalt, nickel, and lithium, is processed to recover these metals. The anode material, which is typically composed of graphite, is treated to recover the carbon and other materials. The electrolyte is processed to recover the lithium and other valuable components.

In the present invention, black mass is recovered from both a solid material stream and a liquid stream.

The black mass, comprising recovered metals and components, can then be processed further to produce high-quality materials suitable for use in the production of new batteries.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1A:
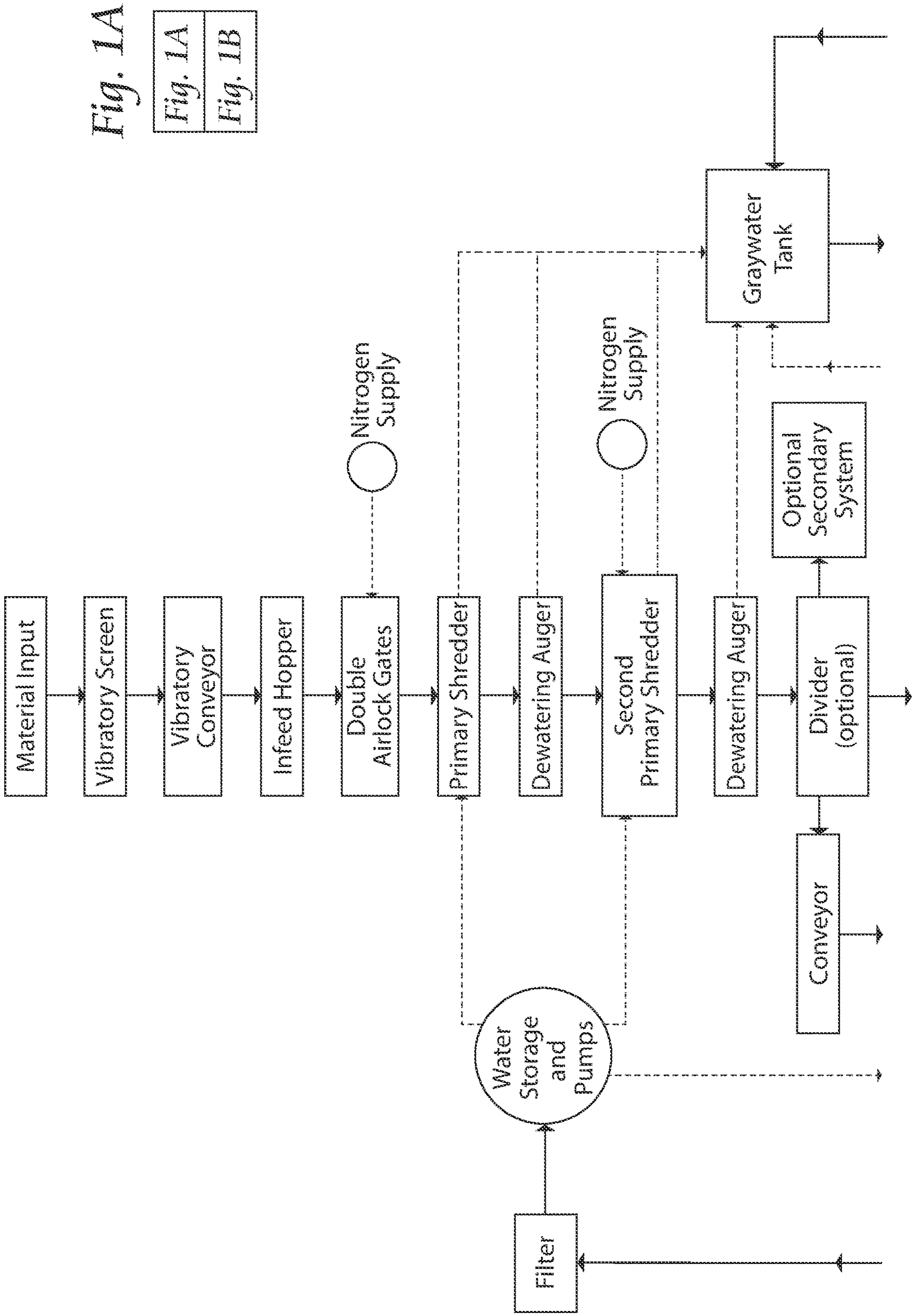
FIGS. 1A and 1B combined is a schematic drawing of a lithium-ion battery recycling system of the present invention.
Figure 1B:
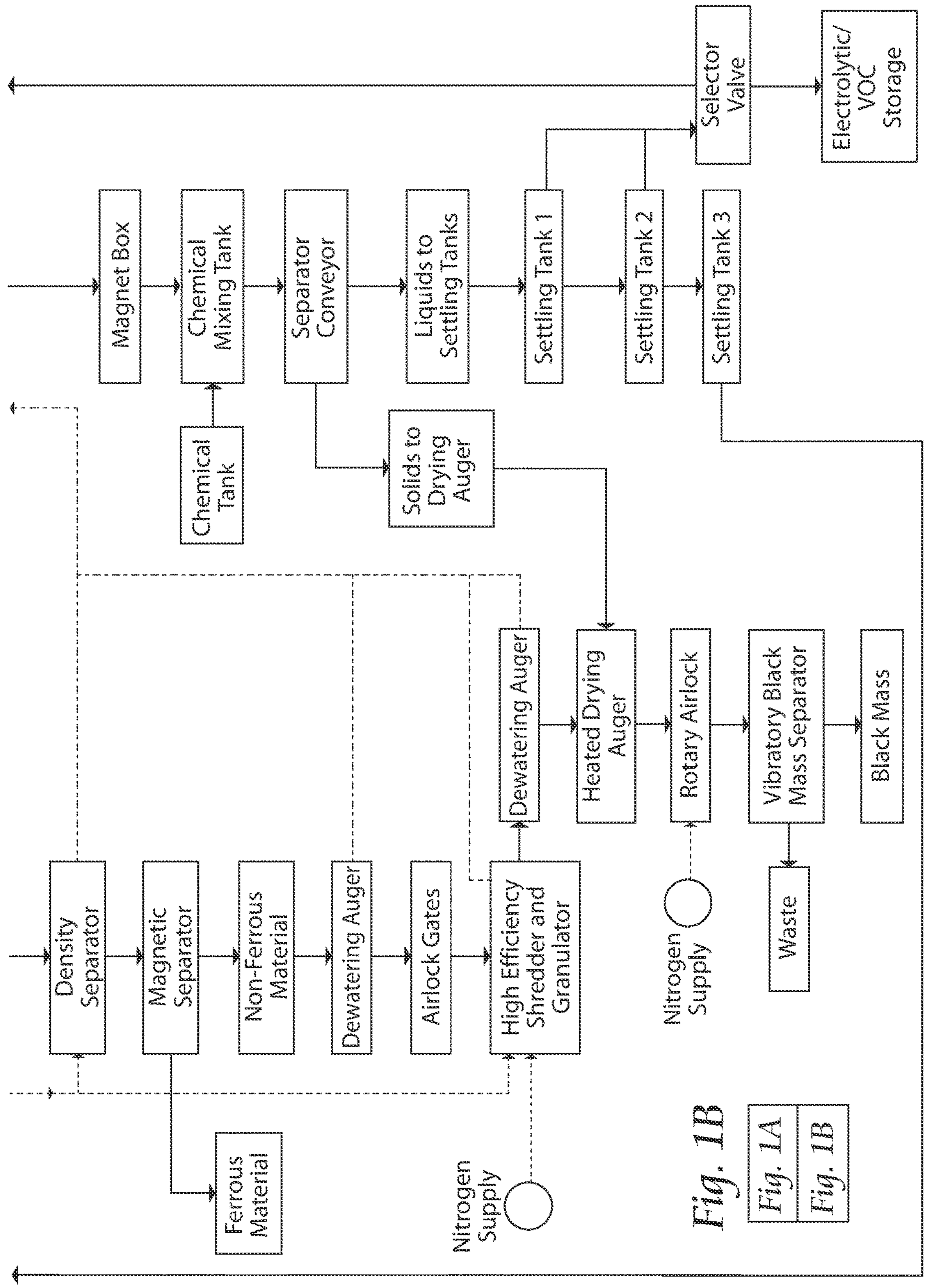

Referring now to FIGS. 1A and 1B, systems and methods for producing black mass from lithium-ion batteries are disclosed.

At the beginning of the process, batteries are preferably placed onto a vibratory screen and conveyor, which can separate foreign debris off of the surface of batteries. The conveyor passes the batteries to an infeed hopper.

In a preferred embodiment, the infeed hopper is equipped with vent fittings for an air system, one or more baffles, and bulkhead couplers for water flow and inert gas as needed, and an inspection door with safety interlock. The infeed hopper limits debris and is preferably capable of withstanding explosive materials. The infeed hopper directs downstream in a controlled manner.

From the infeed hopper, batteries are passed to a nitrogen air lock to create a closed environment between double airlock gates. The nitrogen airlock prevents the release or combustion of flammable and explosive gases that may be generated during the recycling process. The nitrogen airlock is pressurized with nitrogen gas, an inert and non-reactive gas, which creates an oxygen-free environment that is safe for handling the batteries and processing the components. Nitrogen displaces the ambient air in the airlock, the flow of outside air and other substances into the closed environment is prevented. In use, a first (preferably top) door of the airlock opens to accept the battery material from the infeed hopper, while the second (preferably bottom) door remains closed. The first door is then closed and the closed environment between the two doors is purged of air using nitrogen gas, and then a positive pressure of nitrogen is maintained within the environment to prevent the ingress of air and other substances. The nitrogen air lock system can be designed to include a nitrogen inlet and outlet, a pressure regulator, pressure gauges, filters, valves, and sensors, as known in the art. After introduction of nitrogen in the airlock, the second (bottom) door opens, and the batteries then pass from the airlock to a primary shredder.

The atmosphere in the process preferably remains closed to outside air from the airlock gates downstream to a deposition point from a dewatering auger onto a density separator, described later.

A primary shredder, such as an ES2000 model shredder produced by BCA Industries, uses rotating blades, breaks down the batteries into smaller pieces by crushing, or comminuting, the batteries. The blades strike the batteries, breaking them down into smaller pieces.

At the primary shredder (and elsewhere downstream in the system), liquids such as water are introduced in an essentially closed-loop system, as will be described in detail below. Liquids in the closed-loop system also include aqueous chemicals mixed with water (such as flocculants as described later), and components of the shredded batteries entrained in the water and/or aqueous chemicals mixed with water. Because traditional lithium-ion batteries contain liquid electrolyte, the liquid electrolytes also become entrained in liquid upon the batteries being shredded. Lithium salts such as $LiPF_6$, $LiBF_4$, and $LiClO_4$ are commonly combined with an organic solvent in the liquid electrolyte solution, and these lithium salts also become entrained in the liquid stream.

Liquid from a water storage and pump system is introduced into the primary shredder. Because lithium-ion batteries can release heat during the shredding process, the addition of liquid also helps to dissipate this heat, reducing the risk of fire and improving the efficiency of the process. Liquid also improves the liberation of valuable battery components by helping to soften the polymers and plastics used in the batteries, making it easier to separate the metals and other solid materials for recovery. Liquid also performs a physical rinsing/washing function on the shredded material stream, separating smaller components of the shredded material stream from larger components of the shredded material stream. Liquid also controls dust and minimizes the release of hazardous particulates into the environment and limits exposure of workers to battery particulates.

Although the present systems and methods can be used without liquid, thermal runaway of processed batteries could be severe and limit the tons per hour that can be processed safely if liquid is not used, so liquid use is preferable.

During shredding, aqueous effluent is generated by shredding the spent lithium-ion batteries underwater. This aqueous effluent is collected from the primary shredder and transported to a downstream gray water tank for treatment as described later, to recover the organic solvents which are solubilized in the aqueous effluent.

A dewatering auger is used to convey on the shredded material stream from the primary shredder to a second primary shredder. The dewatering auger separates liquid (introduced at the primary shredder upstream) from the shredded battery solids by using a screw conveyor that is housed within a cylindrical casing. The screw conveyor is driven by an electric motor and operates in a rotational manner. The casing has an inlet at one end and an outlet at the other end, through which the material to be dewatered is fed into the casing from the primary shredder and discharged out to a second primary shredder, respectively. The screw conveyor has flights that are spaced apart from each other, allowing liquid from the dewatering process to flow freely through the spaces. In operation, the dewatering auger operates by slowly rotating the screw conveyor, allowing the shredded material stream to be conveyed through the casing while the liquid from the dewatering process is collected in a sump located below the dewatering auger, and the liquid is circulated into the closed-loop liquid system, described later.

The dewatering auger passes the dewatered shredded material stream to a second primary shredder for further size refinement as described above in relation to the primary shredder. Similar to the primary shredder, the second primary shredder also receives liquid from the water storage and pump system to use in the shredding process. From the second primary shredder, the shredded material stream is passed through another dewatering auger, which also recycles the collected liquid into the closed-loop system.

This dewatering auger passes the shredded material stream downstream. At this point in the process, optionally, a divider can be used to physically divide the shredded material stream into two or more streams, which can increase machine throughput. A divider can also be used to shut down one of the streams, for instance, if service or maintenance is to be performed, while the other stream continues to be processed. If a divider is used, downstream processing of the divided material streams thereafter is preferably the same for the two or more streams, but different processes may be employed.

A conveyor preferably passes the shredded material stream to a density separator table (also known as a gravity separator, a gravity table, or a density separator). Preferably, a wet density separator is used, which separates the shredded material stream by different specific gravities of individual shredded fractions. Denser and heavier fractions, such as bolts, steel, and other metals, are separated from lighter particles such as plastic that are washed down the separator. The separator also may employ vibration for fluidization and conveying, and tilt (or slope) for separating different materials of the shredded material stream. Two outlets collect the less dense and denser materials separately.

From the density separator, the denser portion of the shredded material stream is passed to a magnetic separator. Magnetic separation is a process used to separate magnetic materials from a mixture of magnetic and non-magnetic materials. The magnetic separator preferably includes a housing, a magnetic drum, a feed hopper, and a discharge chute. The feed hopper is positioned above the magnetic drum and is configured to receive the mixture of magnetic and non-magnetic materials. The magnetic drum is rotatably mounted within the housing and includes a plurality of permanent magnets. As the magnetic drum rotates, magnetic particles are attracted to the surface of the magnetic drum by the magnetic field generated by the permanent magnets. A pair of discharge chutes are positioned below the magnetic drum, one is configured to discharge the magnetic particles separated by the magnetic drum, and the other configured to discharge the non-ferrous materials. Chain conveyors can convey the ferrous material (battery scrap such as cases, bolts, lugs, etc), into dump hoppers for disposal or separate recycling.

A separate auger receives lighter non-ferrous material from the magnetic separator and the shredded material stream is passed to another dewatering auger. This dewatering auger also returns collected water to the closed-loop system.

The dewatering auger preferably conveys the shredded material stream to another airlock as described above. The shredded material stream passes from the airlock to a high efficiency shredder-granulator having a plurality of rotary shear blades with a shearing surface, a plurality of stationary bed knives with a cutting surface, and two counter-rotating shafts. U.S. Pat. No. 8,128,013, incorporated herein by reference, discloses a high efficiency shredder-granulator which can be employed at this stage in the process. In the high efficiency shredder-granulator, each of the rotary shear blades and stationary bed knives has an aperture for assembling on a counter-rotating shaft. The rotary shear blades and stationary bed knives are alternatingly placed onto the two counter-rotating shafts. A spacer may be placed between each rotary shear blade and stationary bed knife. The counter-rotating shafts are placed into a frame so that each rotary shear blade is opposite a stationary bed knife. The stationary bed knives are further secured to the inner edge of the frame so that the cutting surface is upward.

The use of a high efficiency shredder-granulator having a plurality of rotary shear blades allows a very small shredded chip size to result without the use of traditional screens, as screening wet material would be more difficult. In a preferred embodiment, two shredders size reduce the shredded material stream first to a roughly ¾" particle size and next to a roughly ½" particle size in the double shredding process. Also in a preferred embodiment, liquid and nitrogen are introduced at this high efficiency shredder-granulator.

The shredded material stream exits the high efficiency shredder-granulator, and is preferably placed onto a dewatering auger, which recycles liquid introduced into the high efficiency shredder-granulator back into the closed-loop system.

The shredded material stream exits the dewatering auger, then goes into one or more heated drying augers to draw foil out and further dry the materials during conveyance. The shredded material stream is joined at the heated drying augers by wet solids from a separator conveyor from a separate stream, as will be discussed below. Alternatively, the wet solids from the separator conveyor can be dried by an independent heated drying auger and the dried black mass can join the black mass from the solid material stream on the vibratory black mass separator. Foils, which are typically made of aluminum or copper, are often mixed with other metals and materials in the shredded material stream. By removing the foils, the recycling process produces a higher purity black mass product that is more valuable and can be more easily resold.

Following the heated drying auger, the shredded material stream enters a rotary airlock, after which the black mass is separated from the foils by a vibratory black mass separator or screen, which screens out black mass from foils. The vibratory black mass separator shakes out loose black mass from the shredded material stream, and the screened black mass falls through a screen where it is collected. The foils can be discarded or separately recycled, while the black mass, as the end-product of the prior processes, can then be collected, and processed further according to the desired end-product.

Closed Loop Liquid System

In a preferred embodiment, a closed-loop liquid processing system is employed in the disclosed system. One aspect of the present invention is optimizing black mass recovery entrained in a liquid stream.

Liquid substances are processed, transported, and treated in an essentially closed and continuous flow regime. In such a system, the liquid is contained within the closed circuit and is continuously circulated, with the processed liquid being returned to the start of the system (considered the water storage and pump as shown in FIG. 1A) for subsequent and repeated usage. This type of system helps to produce the purest black mass end-product, reduce the amount of waste generated, as well as conserve resources, as the same liquid is processed and reused multiple times.

The closed-loop liquid processing system preferably comprises a series of interconnected components, such as pumps, filters, and storage tanks that are designed to perform specific tasks in the processing and treatment of the liquid.

The system may also be equipped with control systems, such as sensors, valves, and automated controllers, to regulate the flow and treatment of the liquid, as well as ensure safety and efficiency.

The closed-loop liquid processing system of the present invention begins with a water tank, initially filled on system startup. Downstream, as is known in the art, are a pump and a pressure tank combination for creating and maintaining water pressure and consistent flow to the downstream components of the battery recycling system.

From the pressure tank, water is distributed to a series of system components by a series of manifolds. Water is received by the primary and second primary shredder, a density separator, and the single-pass high efficiency shredder-granulator. If the optional divider is used to divide the shredded material stream into two or more streams as previously discussed, water will be distributed to the duplicate components of the secondary processing system, including a second density separator, and a second single-pass high efficiency shredder-granulator.

In a preferred embodiment, the primary and second primary shredder, density separator, and the single-pass high efficiency shredder-granulator components are equipped with liquid reservoirs with liquid level sensors which, upon command by a liquid level sensor upon reaching a predetermined level, direct pumping downstream into a gray water tank equipped with a height sensor.

Liquid is pumped from the gray water tank upon command by the height sensor upon reaching a predetermined level, downstream to a magnet box. The magnet box uses magnetic fields to separate ferromagnetic materials from the liquid by using an embedded electromagnet to attract and retain magnetic particles, while allowing the remainder of the liquid to pass to a separator conveyor, preferably preceded by a chemical mixing tank. The remaining liquid contains solid particles for recycling, in a suspension in which the solid particles are dispersed throughout the liquid.

At the chemical mixing tank, chemicals such as polymer flocculants are introduced to the incoming liquid stream (for instance by a capillary pump) to promote the aggregation of particles in liquid suspension in the incoming liquid. The polymer flocculants work by adsorbing onto the surfaces of the particles in the incoming liquid suspension, causing the particles to stick together and form larger, more easily separable clumps or flocs.

The liquid stream, now containing the polymer flocculants clumping the particulate matter, is next passed to a separator conveyor for separating liquids and solids, and effectively preparing the wet solid materials for quick drying where the dried solid materials will form highly valuable black mass.

Wet solids from the separator conveyor are passed to either a dewatering auger, or preferably a heated drying auger (out of the closed loop liquid system). After drying, these solids are highly desirable and pure black mass. This black mass material can be placed onto a vibratory black mass separator, but this step is optional. Alternatively, black mass material exiting the heated drying auger coupled to the separator conveyor Liquids from the separator conveyor are pumped to preferably a series of settling tanks. The series of settling tanks, also known as sedimentation tanks, clarifiers, or decantation tanks, remove remaining suspended solids from the liquid stream. The tanks allow particles to settle to the bottom of the tank and form a sludge layer, which can be removed and disposed of separately from the treated liquid. By using multiple settling tanks in series, the efficiency of the solids separation process can be improved, as each tank in the series can remove additional solids from the liquid.

Intermediately in the series of settling tanks, liquid containing a greater percentage of non-water impurities (i.e. sludge) is sent to a selector valve, which sends the liquid to either an electrolyte/voc storage tank (out of the closed loop), or recycled back upstream into the gray water tank for resumption of travel in the closed loop.

At the end of the series of settling tanks, clarified liquid is pumped through a filter and back to the beginning of the closed loop liquid system—the initial water tank—where the process resumes or continues from the beginning.

Figure 2A:
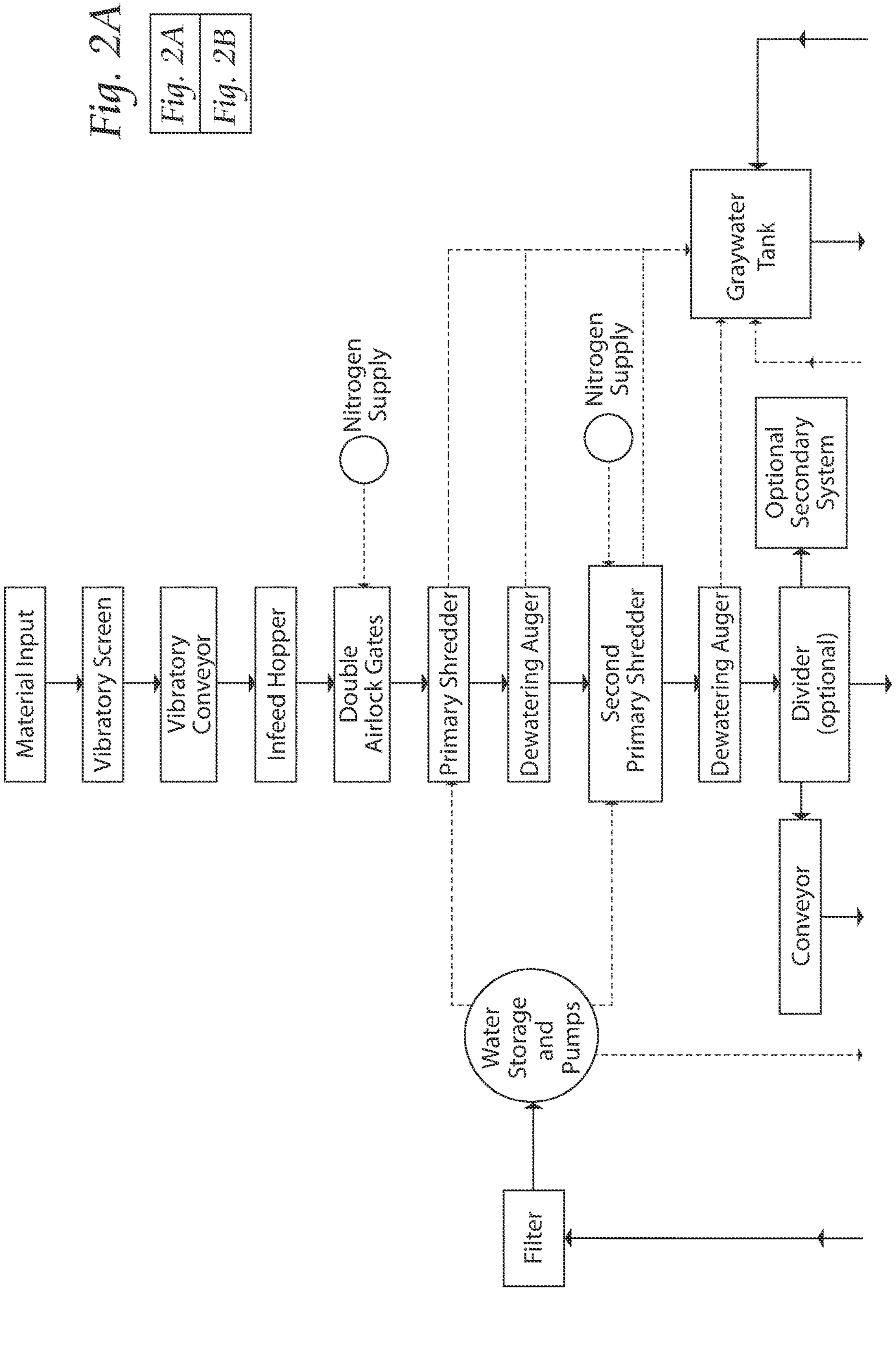
FIGS. 2A and 2B combined is a schematic drawing of an alternate embodiment of a lithium-ion battery recycling system of the present invention.
Figure 2B:
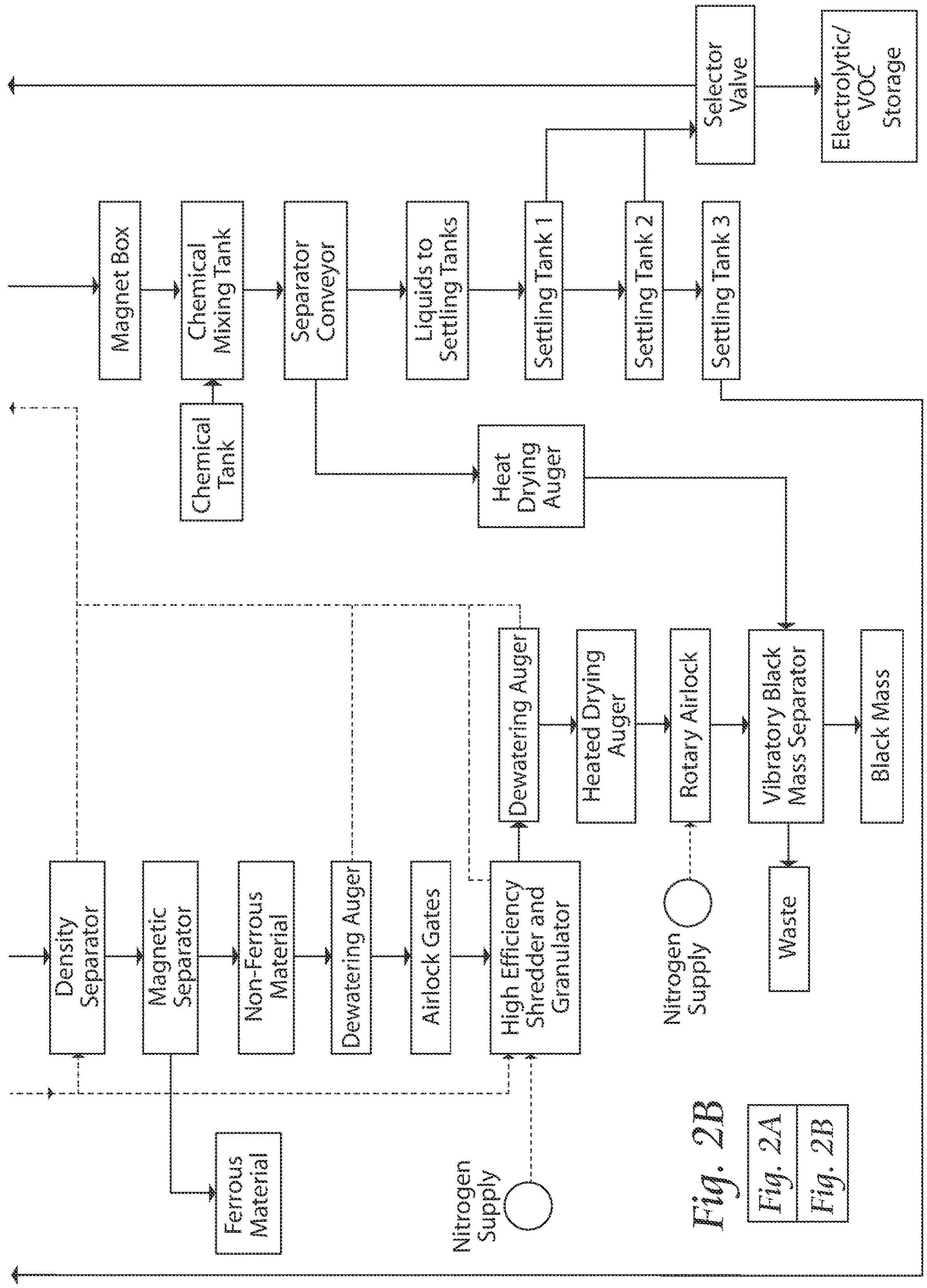

Referring now to FIGS. 2A and 2B combined, a schematic drawing of an alternate embodiment of a lithium-ion battery recycling system of the present invention is shown. In this embodiment, wet solids from the separator conveyor are passed to a heated drying auger, which then passes the dried solids to the vibratory black mass separator and further processing as previously described.

Figure 3A:
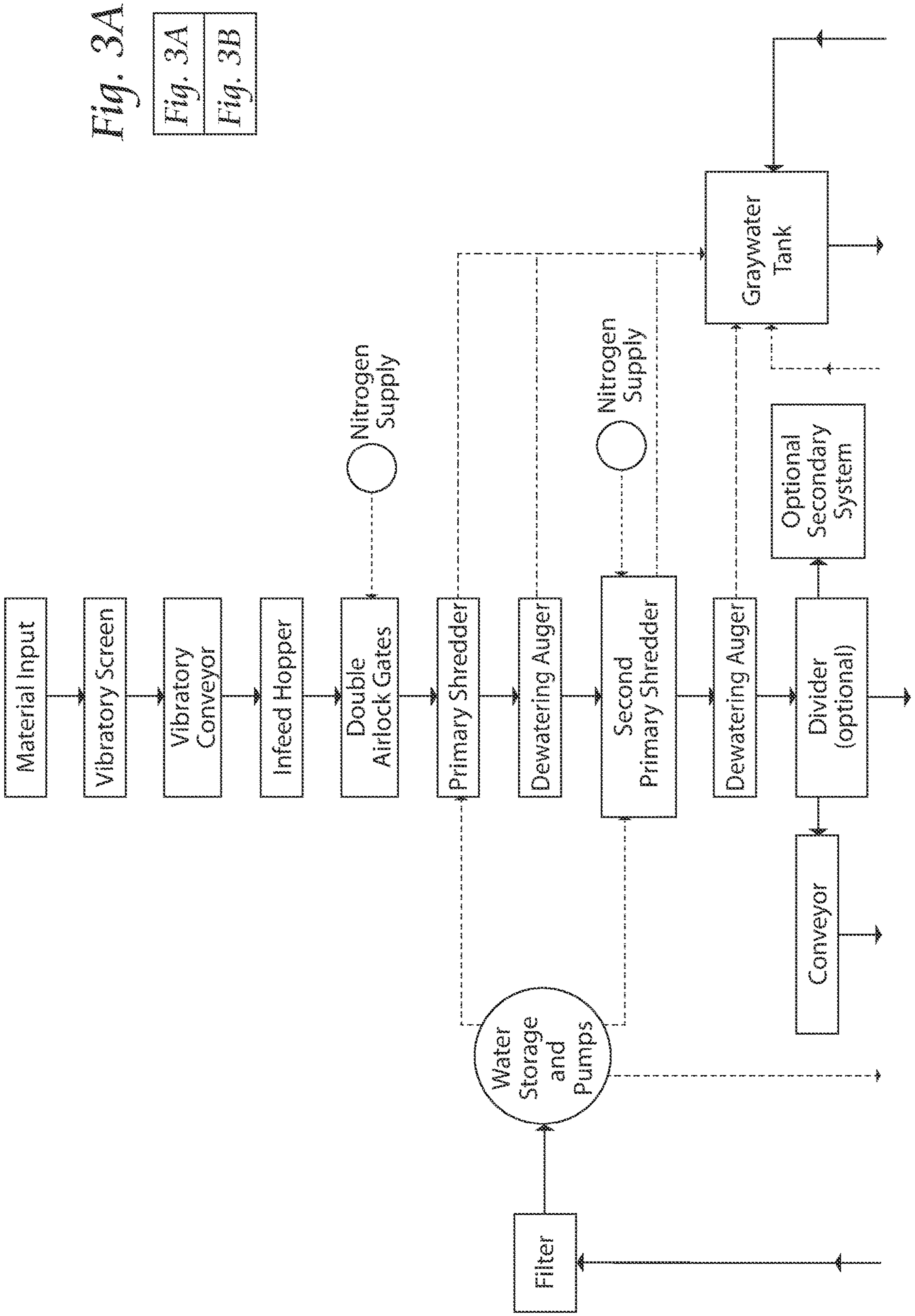
FIGS. 3A and 3B combined is a schematic drawing of a second alternate embodiment of a lithium-ion battery recycling system of the present invention.
Figure 3B:
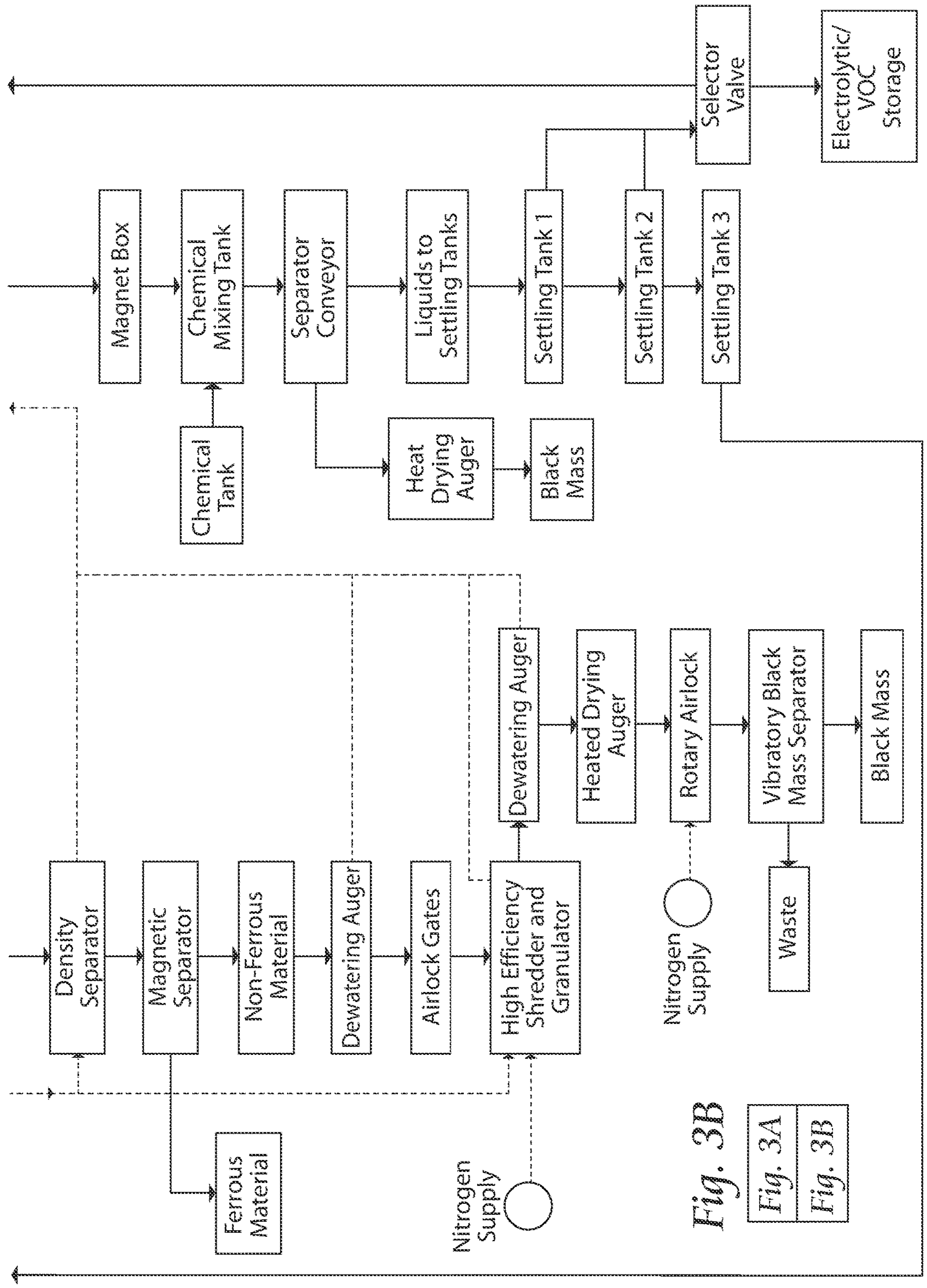

Referring now to FIGS. 3A and 3B combined, a schematic drawing of a second alternate embodiment of a lithium-ion battery recycling system of the present invention is shown. In this embodiment, wet solids from the separator conveyor are passed to a heated drying auger, from which the dried black mass is collected.

When the terms couple, coupled or coupling are used herein, these terms do not require a direct connection or preclude the use of intermediate elements in the process or the machine.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A system for processing a material stream to be recycled into constituents, the system comprising:

- a primary shredder;
- a material separator comprising at least one of a density separator and a magnetic separator, said material separator coupled to said primary shredder;
- a shredder-granulator comprising a plurality of rotary shear blades, said shredder-granulator having a sealed housing and being configured to receive a slurry including flocculated black mass and to comminute the flocculated black mass into chips while maintaining the black mass in slurry form, said shredder-granulator coupled downstream of said material separator;
- a black mass separator coupled to and receiving said chips in said slurry from said shredder-granulator, said black mass separator comprising a waste discharge and a black mass discharge and being configured to separate said black mass from said material stream;
- a fluid distribution system, said fluid distribution system comprising:
  - a fluid reservoir coupled to said primary shredder;
  - a graywater tank coupled to said primary shredder and configured as a contaminated fluid accumulator distinct from said fluid reservoir;
  - a chemical mixing tank coupled to said graywater tank and coupled to a chemical source of flocculant, said chemical mixing tank configured to receive contaminated process water from said graywater tank and flocculant from said chemical source of flocculant and to produce a flocculated slurry in which black mass is aggregated;

a separator conveyor coupled to said chemical mixing tank, said separator conveyor coupled to a solid material discharge that discharges flocculated black mass and a liquid material discharge that discharges clarified process water;

said fluid reservoir coupled to and receiving said clarified process water from said separator conveyor and being fluidically isolated from said graywater tank except through said separator conveyor and at least one settling tank such that said fluid reservoir, said graywater tank, said chemical mixing tank, and said separator conveyor cooperatively comprise a closed-loop water circuit configured to recirculate process water within said system; and a conveyor coupled to said solid material discharge of said separator conveyor and configured to deliver the flocculated black mass to said black mass separator.

2. The system according to claim 1, the system further comprising a second primary shredder positioned between said primary shredder and said material separator, said second primary shredder coupled to said primary shredder and coupled to said material separator, wherein said second primary shredder is configured to operate in a dry comminution mode without immersion liquid and to receive a dewatered solid component from a first dewatering auger positioned between said primary shredder and said second primary shredder.

3. The system according to claim 2, the system further comprising a first dewatering auger positioned between said primary shredder and said second primary shredder, said first dewatering auger comprising a fluid discharge and a helical screw configured to separate a solid component and a fluid component of material received from said primary shredder, said first dewatering auger coupled to a solid component discharge that is coupled to said second primary shredder and coupled to a fluid component discharge.

4. The system according to claim 3, the system further comprising a fluid coupling between said first dewatering auger and said graywater tank, said graywater tank coupled to said fluid component discharge and configured to receive substantially all fluid components discharged from said first dewatering auger.

5. The system according to claim 2, said fluid reservoir coupled to said second primary shredder by a dedicated fluid circuit separate from a fluid circuit between said fluid reservoir and said shredder-granulator.

6. The system according to claim 5, the system further comprising a second dewatering auger comprising a fluid discharge and a helical screw configured to separate a second solid component and a second fluid component, said second dewatering auger positioned between said second primary shredder and said material separator, said second dewatering auger coupled to a second solid component discharge coupled to said material separator and coupled to a second fluid component discharge.

7. The system according to claim 6, the system further comprising a fluid coupling between said second dewatering auger and said graywater tank, said graywater tank coupled to said second fluid component discharge and configured to receive substantially all second fluid components discharged from said second dewatering auger.

8. The system according to claim 1, wherein said material separator comprises a wet density separator coupled to said fluid reservoir by a wet density separator discharge and configured to receive only solid material from said second dewatering auger and process water from said fluid reservoir.

9. The system according to claim 8, the system further comprising a fluid coupling between said wet density separator and said graywater tank, said graywater tank coupled to said wet density separator discharge and configured to receive contaminated overflow fluid from said wet density separator.

10. The system according to claim 1, wherein said material separator comprises:

a magnetic separator, said magnetic separator coupled to a ferrous discharge and a non-ferrous discharge;

a repository coupled to said ferrous discharge; and wherein said non-ferrous discharge is coupled to said shredder-granulator and configured to deliver non-ferrous material directly into the slurry within said shredder-granulator.

11. The system according to claim 10, the system further comprising a third dewatering auger coupled between said magnetic separator and said shredder-granulator, said third dewatering auger configured to dewater non-ferrous material before introduction into said shredder-granulator and coupled via a fluid outlet to said graywater tank.

12. The system according to claim 11, the system further comprising a fluid coupling between said third dewatering auger and said graywater tank.

13. The system according to claim 1, said fluid reservoir coupled to said shredder-granulator via a dedicated fluid circuit configured to supply clarified process water to said shredder-granulator independently of said graywater tank.

14. The system according to claim 13, the system further comprising at least one of a fourth dewatering auger and a heated drying auger coupled between said shredder-granulator to and said black mass separator, said at least one of a fourth dewatering auger and a heated drying auger configured to dewater or dry the chips discharged from said shredder-granulator before entry into said black mass separator.

15. The system according to claim 1, wherein said liquid material discharge is coupled to said fluid reservoir and configured to deliver only clarified process water that has been separated from flocculated black mass in said separator conveyor.

16. The system according to claim 15, the system further comprising at least one settling tank positioned between said separator conveyor and said fluid reservoir said at least one settling tank configured to receive liquid from said liquid material discharge and to discharge clarified liquid to said fluid reservoir and settled solids to said graywater tank.

17. The system according to claim 16, wherein said at least one settling tank is coupled to a storage container configured to accumulate settled solids comprising residual black mass prior to reintroduction to said chemical mixing tank.

18. The system according to claim 1, said system further comprising a divider positioned between said primary shredder and said material separator, said divider comprising a first divider discharge and a second divider discharge, wherein said first divider discharge is coupled to said material separator and said second divider discharge is coupled to said primary shredder or said second primary shredder.

19. The system according to claim 1, the system further comprising:

a material receiver;

an infeed hopper coupled to said material receiver and said primary shredder, said infeed hopper being configured to receive whole battery modules and direct said whole battery modules into said primary shredder while submerged in process water supplied from said fluid reservoir.

20. The system according to claim 19, the system further comprising an airlock between said infeed hopper and said primary shredder.

21. The system according to claim 20, said airlock further comprising a pair of gates coupled to said infeed hopper and an inert gas supply coupled to said airlock, said inert gas supply configured to purge the airlock between said gates before opening one of said gates to deliver batteries to said primary shredder.

22. The system according to claim 21, said inert gas comprising nitrogen.

23. The system according to claim 1, said solid material discharge of said separator conveyor coupled to a dryer.

* * * * *